United States Patent
Viault et al.

(10) Patent No.: US 8,496,235 B2
(45) Date of Patent: Jul. 30, 2013

(54) SUSPENSION THRUST BEARING DEVICE AND STRUT

(75) Inventors: Samuel Viault, Tours (FR); Christophe Houdayer, Semblancay (FR); Bruno Montboeuf, Cérelles (FR)

(73) Assignee: Aktiebolaget SKF, Göteborg (SE)

( * ) Notice: Subject to any disclaimer, the term of this patent is extended or adjusted under 35 U.S.C. 154(b) by 326 days.

(21) Appl. No.: 12/919,367

(22) PCT Filed: Feb. 18, 2009

(86) PCT No.: PCT/EP2009/051939
§ 371 (c)(1), (2), (4) Date: Nov. 19, 2010

(87) PCT Pub. No.: WO2009/106469
PCT Pub. Date: Sep. 3, 2009

(65) Prior Publication Data
US 2011/0101584 A1    May 5, 2011

(30) Foreign Application Priority Data
Feb. 28, 2008    (FR) ...................... 08 51303

(51) Int. Cl.
*F16C 19/12*    (2006.01)
(52) U.S. Cl.
USPC .......................... 267/220; 384/607; 384/609
(58) Field of Classification Search
USPC ............ 267/219, 220; 280/124.147, 124.155; 384/607, 609, 617
See application file for complete search history.

(56) References Cited

U.S. PATENT DOCUMENTS

| | | | | |
|---|---|---|---|---|
| 5,467,971 A | * | 11/1995 | Hurtubise et al. | 267/220 |
| 6,267,512 B1 | * | 7/2001 | Beghini et al. | 384/609 |
| 6,558,043 B2 | * | 5/2003 | Beghini et al. | 384/615 |
| 6,814,496 B2 | * | 11/2004 | Beghini et al. | 384/617 |
| 7,811,005 B2 | * | 10/2010 | Beghini et al. | 384/609 |
| 8,226,301 B2 | * | 7/2012 | Poulle et al. | 384/609 |
| 2002/0003913 A1 | | 1/2002 | Beghini | |
| 2005/0089255 A1 | * | 4/2005 | Debrailly et al. | 384/609 |
| 2011/0291337 A1 | * | 12/2011 | Viault et al. | 267/220 |
| 2012/0146306 A1 | * | 6/2012 | Dubus et al. | 280/124.155 |
| 2012/0257849 A1 | * | 10/2012 | Corbett et al. | 384/607 |

FOREIGN PATENT DOCUMENTS

| | | |
|---|---|---|
| EP | 1445129 A1 | 8/2004 |
| FR | 2811264 A1 | 1/2002 |
| FR | 2829429 A1 | 3/2003 |
| FR | 2857906 A1 | 1/2005 |

* cited by examiner

*Primary Examiner* — Christopher Schwartz
(74) *Attorney, Agent, or Firm* — Mark A. Ussai; Bryan Peckjian

(57) ABSTRACT

The suspension thrust bearing device comprises a rolling bearing 44 forming an axial stop and a support element 42 for the rolling bearing forming bearing means for a spring, the rolling bearing comprising a bottom ring 48 in contact with the support element, a top ring 46 and a plurality of rolling elements 50 positioned between the rings. The support element 42 comprises a body 60 and a stiffening insert 66 at least partly covered by the body. The body is formed of a rigid material 62 for the transmission of axial forces between the spring and the rolling bearing and a flexible material 64 to provide at least one dynamic seal 84*b*, 86*b* inside the device. At least a part of the rigid material is situated radially between the flexible material and the stiffening insert.

11 Claims, 6 Drawing Sheets

SUSPENSION THRUST BEARING DEVICE AND STRUT

BACKGROUND OF THE INVENTION

The present invention relates to the field of suspension thrust bearing devices used in particular on motor vehicles in the suspension struts of the steered road wheels.

The invention relates more particularly to a suspension thrust bearing comprising a top ring and a bottom ring between which are positioned rolling elements, for example balls or rollers. The top and bottom rings are generally mounted in contact with bottom and top bearing or support pieces, such as covers or cups. The top and bottom cups form a housing for the rings of the rolling bearing and provide the interface between said rings and the neighbouring elements.

A suspension thrust bearing is positioned in the top part of the suspension strut between the bodywork of the vehicle and a suspension spring. The spring is fitted around a damping piston rod, the end of which is linked to the bodywork of the vehicle through an elastic block that filters the vibrations. The suspension spring axially bears, directly or indirectly, on the bottom cup. The top cup is fixed relative to the bodywork of the vehicle.

The suspension thrust bearing makes it possible to transmit axial forces between the suspension spring and the bodywork of the vehicle, while allowing a rotation movement between the bottom cup and the filtering elastic block. This relative angular movement derives from a steer angle of the steered road wheels of the vehicle and/or the compression of the suspension spring.

A suspension thrust bearing is known from the document EP-B1-1 445 129, that is provided with a bottom support cover and a rolling bearing mounted to bear against the latter. The support cover is made of synthetic material and comprises an axial centring surface for a suspension spring which is prolonged, at its top end, by a radial surface forming a stop for the end of said spring.

In the embodiment illustrated in FIGS. 2 and 4, an intermediate bearing cup is positioned between the suspension spring and the support cover in order to obtain a good distribution of the load applied by the spring and substantially reduce the risks of cracking of the support cover.

In operation, the intermediate bearing cup is exposed to water splashes, which means that anti-corrosion surface treatments such as catophoresis must be used. However, these treatments are relatively costly and their implementation is a polluting factor.

To overcome this drawback, the patent application FR-A1-2 857 906 recommends to embed, inside the bottom support cover, a metal stiffening insert. The use of an additional, separate bearing cup is thus avoided.

However, the suspension thrust bearing of this document presents the drawback of providing only a single narrow passage between a top cover and the bottom support cover supporting the rolling bearing to provide the seal for the bearing.

Thus, in certain conditions, for example when the vehicle is running on a flooded road or even when cleaning the vehicle with a high pressure water jet, water can infiltrate into the rolling bearing with harmful consequences on the life of the rolling bearing.

SUMMARY OF THE INVENTION

The present invention aims at overcoming this drawback.

More particularly, the present invention aims at providing a robust suspension thrust bearing, capable of supporting relatively high axial forces while making it possible to reduce any ingress of water or other pollutants.

The aim of the present invention is therefore to provide a suspension thrust bearing that is particularly reliable over time.

The invention relates to a suspension thrust bearing device comprising a rolling bearing forming an axial thrust bearing and a support element for the rolling bearing forming bearing means for a spring, the rolling bearing comprising a bottom ring in contact with the support element, a top ring and a plurality of rolling elements positioned between the rings. The support element comprises a body and a stiffening insert at least partly covered by the body. The body is formed of a rigid material for the transmission of axial forces between the spring and the rolling bearing and a flexible material to provide at least one dynamic seal inside the device. At least a part of the rigid material is situated radially between the flexible material and the stiffening insert.

The expression "dynamic seal" should be understood here as meaning a seal between two parts of the bearing device, one of the two parts having a relative movement with respect to the other.

In one embodiment, the device comprises a top bearing cover in direct contact with the top ring of the rolling bearing. The dynamic seal can comprise at least one external lip in friction contact with the top bearing cover. The dynamic seal can also comprise at least one internal lip in friction contact with the top bearing cover or the top ring of the rolling bearing.

The expression "external lip" should be understood here as meaning the lip oriented towards the outside of the bearing and the expression "internal lip" should be understood as meaning the lip extending towards the inside of said bearing.

In one embodiment, the rigid material is in direct contact with the stiffening insert. The flexible material can also be in direct contact with the stiffening insert. The stiffening insert can be at least partly embedded inside the body.

Advantageously, the flexible material is at least partly overmoulded over the rigid material and/or at least partly overmoulded over the stiffening insert.

In one embodiment, the stiffening insert comprises means capable of allowing the passage of the overmoulded flexible material through said insert.

The stiffening insert can comprise a radial portion and at least one axial portion.

The invention also relates to a suspension thrust bearing device provided with a rolling bearing forming an axial thrust bearing and comprising a bottom ring, a top ring and a plurality of rolling elements positioned between the rings, a support element for the bottom ring of the rolling bearing forming bearing means for a spring, and a bearing cover in contact with the top ring of the rolling bearing. The support element comprises a body and a stiffening insert at least partly covered by the body. The body is formed of a rigid material for the transmission of axial forces between the spring and the rolling bearing and a flexible material to provide an external dynamic seal between the support element and the bearing cover or the bottom ring of the rolling bearing and an internal dynamic seal between the support element and the bearing cover or the top ring of the rolling bearing.

The invention also relates to a strut comprising a damper and a suspension thrust bearing device as defined previously.

BRIEF DESCRIPTION OF THE SEVERAL VIEWS OF THE DRAWINGS

The present invention will be better understood by studying the detailed description of embodiments given by way of non-limiting examples and illustrated by the appended drawings, in which.

DETAILED DESCRIPTION OF THE INVENTION

Figure 1:
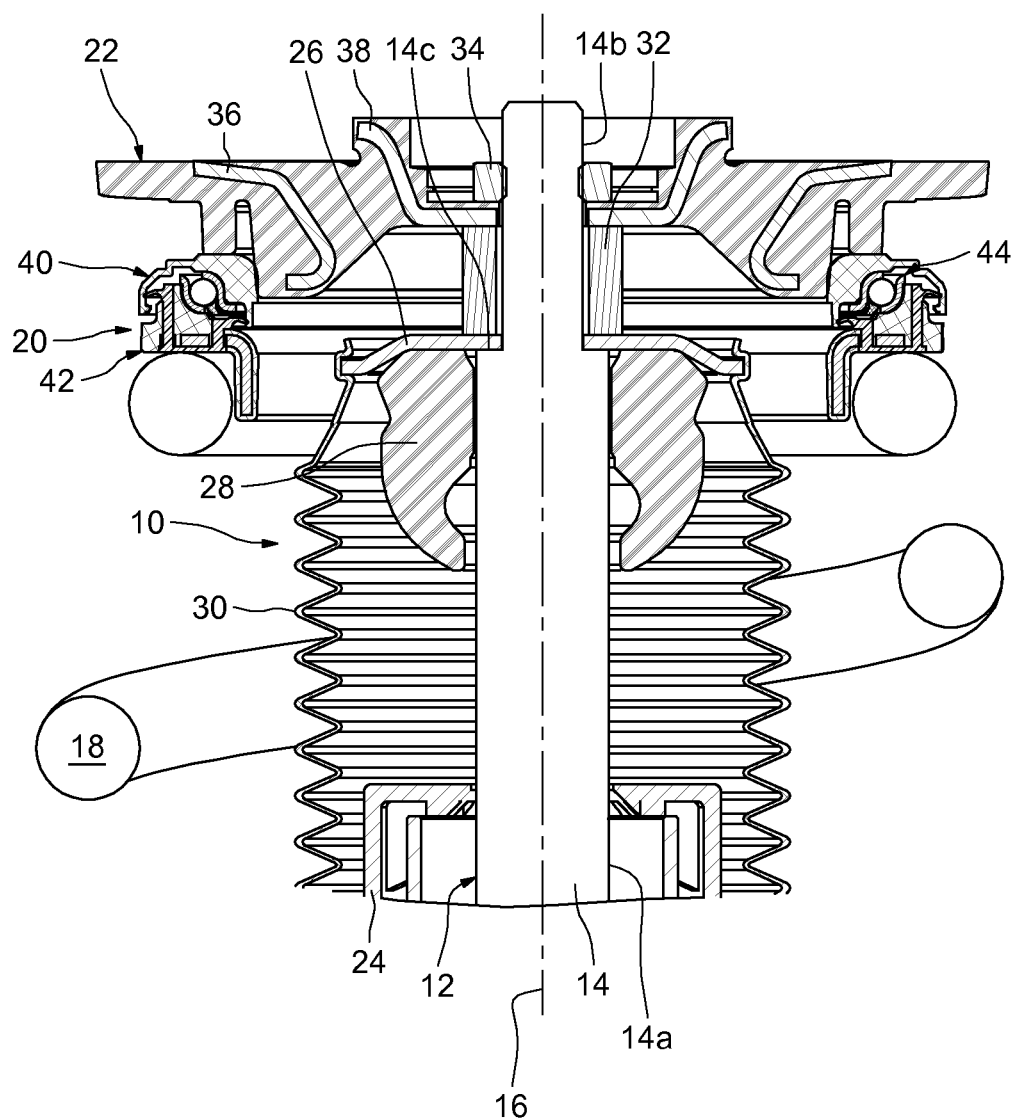
FIG. 1 is an axial cross-sectional view of a suspension thrust bearing device mounted in a strut of a motor vehicle according to a first embodiment of the invention.
Figure 2:
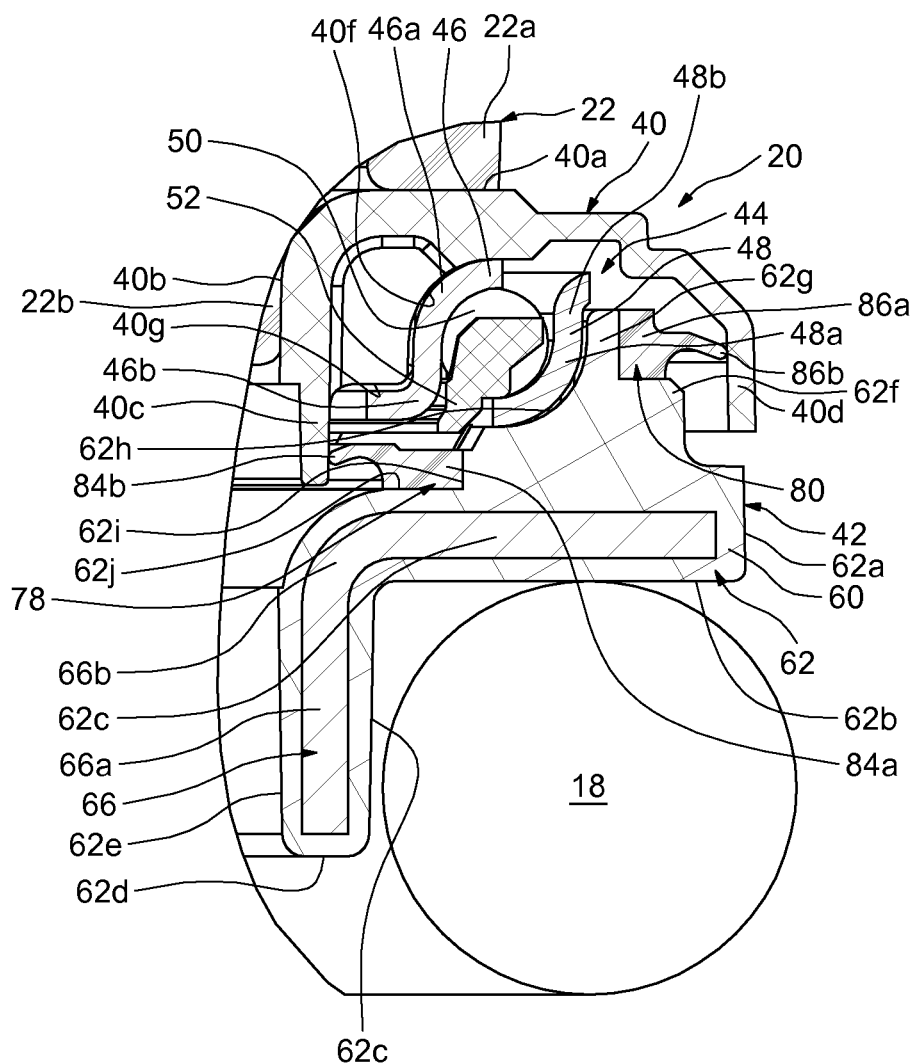
FIGS. 2 and 3 are detail views of FIG. 1 through different cutting planes.
Figure 3:
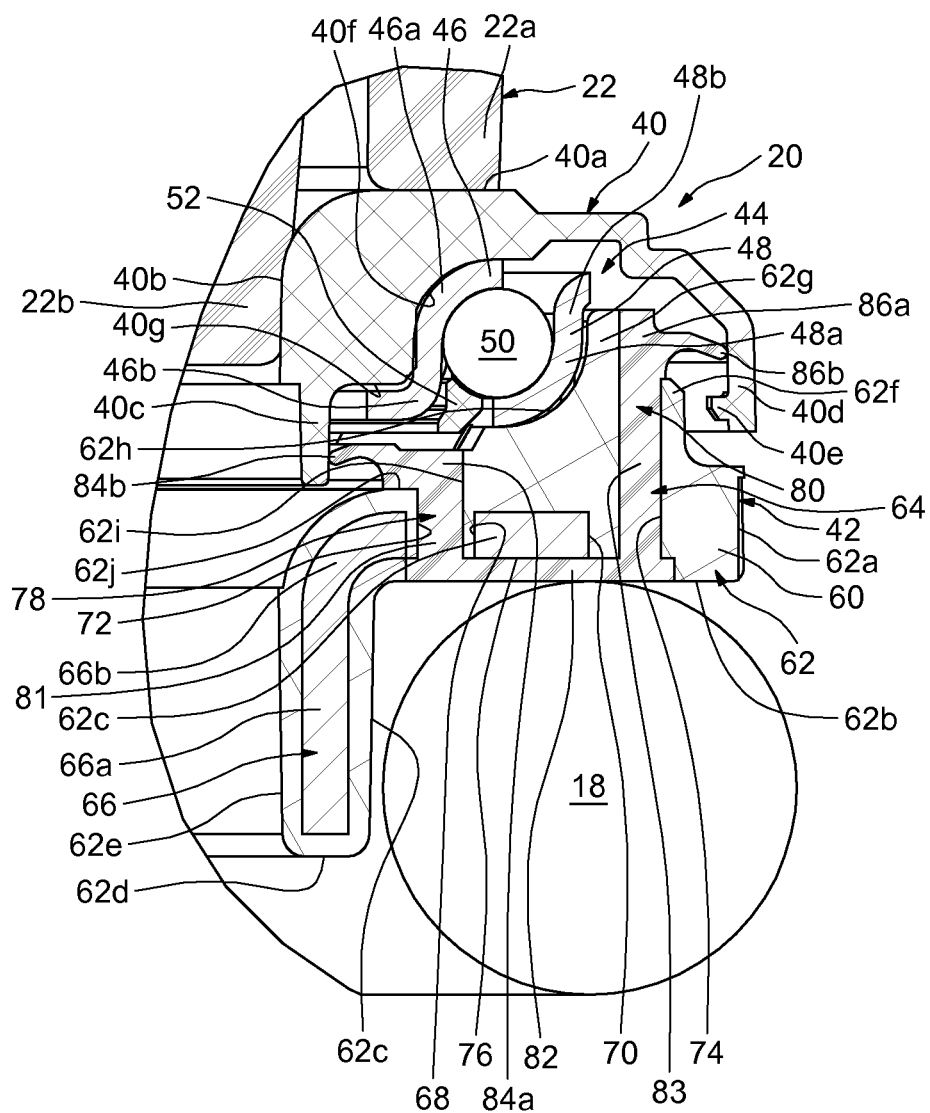
Figure 4:
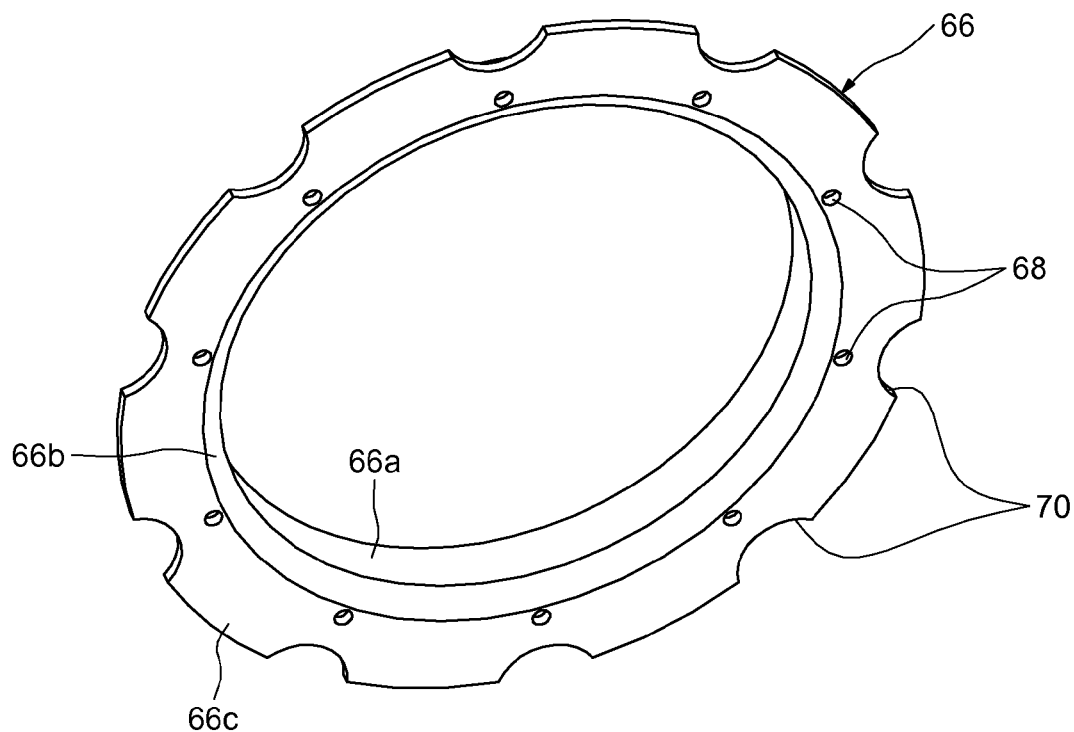
FIG. 4 is a perspective view of a stiffening insert of the device of FIG. 1.
Figure 5:
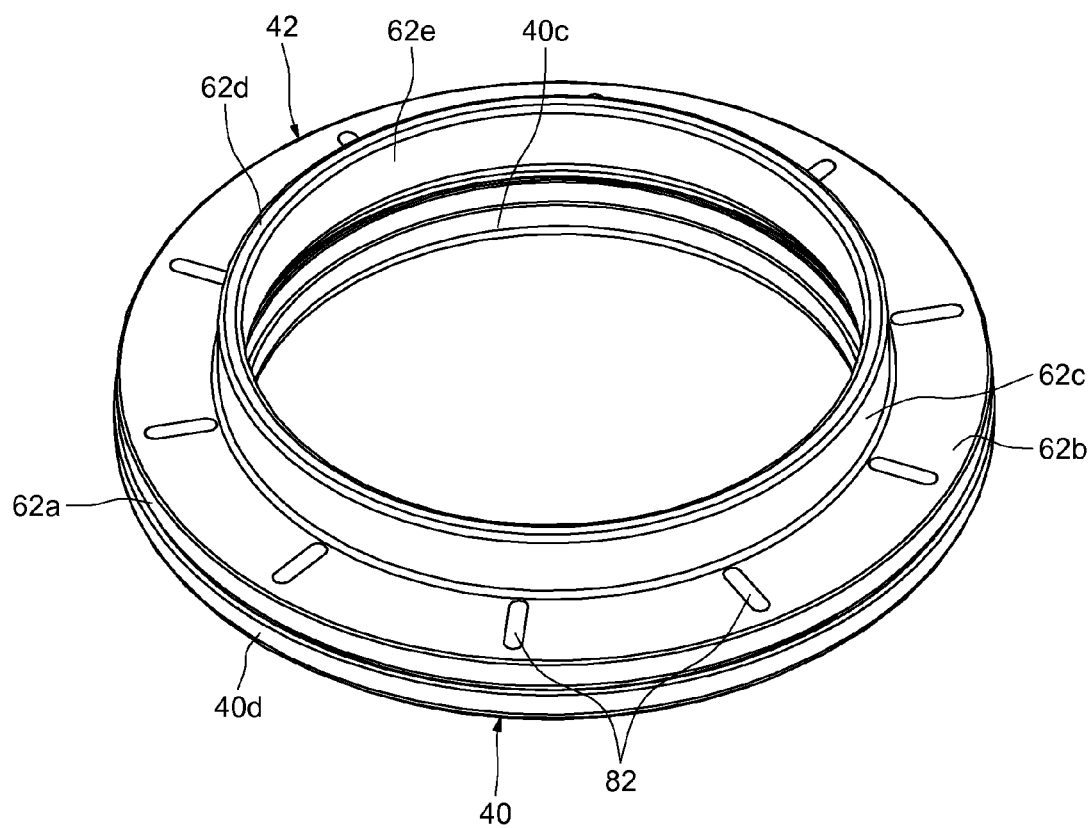
FIG. 5 is a perspective view of the suspension thrust bearing device of FIGS. 1.

As can be seen in FIG. 1, a strut, referenced 10 as a whole and provided with a damper 12 comprising a rod 14, of axis 16, a spring 18, a suspension thrust bearing 20 fitted around the rod 14 and a filtering elastic block 22 positioned between the bearing 20 and the bodywork (not represented) of a motor vehicle in which the strut 10 is mounted.

The damper 12 also comprises a damping cylinder 24 that is partially represented. The rod 14 of the damper has an axial external surfa ce 14a of large diameter, an axial external surface 14b of small diameter, said surfaces being separated by a radial shoulder 14c. The damper 12 also comprises a plate 26 mounted around the axial external surface 14b of small diameter and bearing against the shoulder 14c. A damping ring 28 of generally annular form is fixed, by any appropriate means, to the plate 26. The damping ring 28, for example made of rubber or elastomer, is positioned around the axial external surface 14a of large diameter. A protective bellows 30 is added to the plate 26 so as to surround and protect the various elements forming the damper 12.

The strut 10 also comprises an axial spacer 32 positioned radially around the axial surface of small diameter 14b of the rod 14 and bearing axially against the plate 26 and the elastic block 22. A nut 34 is also provided to cooperate with a corresponding threaded portion of the axial surface 14b of the rod 14 so as to provide for both the tightening of the elastic block 22 against the spacer 32 and the tightening of said elastic block 22 against the suspension thrust bearing 20.

The elastic block 22 can be made of a flexible material, such as an elastomer, in which can be inserted, optionally, one or more rigid inserts, for example made of metal. In the embodiment that is illustrated, two inserts 36, 38, of generally annular form, are provided inside the elastic block 22. The large diameter insert 36 is entirely embedded in the elastic block 22. The small diameter insert 38 is partially embedded inside said block, a radial part bearing against the spacer 32.

As illustrated more visibly in FIGS. 2 to 5, the suspension thrust bearing 20 mainly comprises a top bearing cover 40 in contact with the elastic block 22, a bottom support cover 42 forming bearing means for the spring 18 and a rolling bearing 44 axially positioned between said covers.

The top bearing cover 40 can consist of a single-piece part made of a plastic material, for example polyamide PA 6.6, reinforced or not with glass fibres. The bearing cover 40 comprises a top radial surface 40a in contact with an annular rib 22a of the elastic block 22, an axial surface 40b of small diameter extending downward, from a small diameter end of the radial surface 40a and being centred on an axial portion 22b of the elastic block 22. The axial portion 22b is radially offset towards the inside relative to the annular rib 22a. The top bearing cover 40 also comprises an internal annular axial skirt 40c of small thickness positioned substantially in extension of the axial surface 40b, axially downward.

The top bearing cover 40 also comprises an external annular axial skirt 40d of small thickness and of large diameter connecting to the top radial surface 40a, via a truncated surface prolonging towards the inside a top end of said skirt, itself being prolonged at a small diameter edge towards the inside by a radial surface from which an axial surface extends axially upward, itself being prolonged towards the inside at a top end by a radial surface. A radial protuberance 40e directed towards the inside which can be circumferentially continuous or discontinuous, is provided on the internal edge of the external axial skirt 40d, in the vicinity of its bottom end. The radial protuberance 40e is in this case circumferentially discontinuous and forms evenly distributed catches 40e. The catches 40e are directed radially towards the inside, towards the bottom support cover 42.

The rolling bearing 44 comprises a top ring 46 and a bottom ring 48 made of steel plate, between which is housed a row of rolling elements 50, in this case produced in the form of balls. A cage 52 is also provided so as to maintain an even circumferential spacing between the rolling elements 50. The rolling elements 50 are positioned between rolling raceways formed by the top 46 and bottom 48 rings. Advantageously, said rings can be obtained from one and the same steel plate flank by cutting and stamping, thanks to the fact that the external diameter of the top ring 46 is substantially equal to the internal diameter of the bottom ring 48.

The top ring 46 has a toroidal portion 46a in contact with a complementary surface 40f of the bearing cover 40, said toroidal portion 46a being prolonged towards the inside by a toroidal portion 46b of opposite concavity extending to the vicinity of an annular radial surface 40g that is circumferentially continuous or discontinuous and linked to the surface 40f and to the internal axial skirt 40c. The external surface of the toroidal portion 46a forms the raceway for the rolling elements 50.

The bottom ring 48 also has a toroidal portion 48a, the concave internal surface of which forms a raceway for the rolling elements 50 which comes into contact against the bottom support cover 42. The toroidal portion 48a is prolonged towards the outside by a toroidal portion 48b of opposite concavity. The cage 52 is axially situated between the toroidal portion 46b and the toroidal portion 48a.

The bottom support cover 42 mainly comprises a body 60 formed from a rigid material 62 and a flexible material 64, and a stiffening insert 66 of said body so as to make it possible to obtain a satisfactory rigidity and a good transmission of the axial and radial forces between the spring 18 and the rolling bearing 44.

The rigid material 62 of the body 60 can, for example, be made of plastic material such as a polyamide PA 6.6 reinforced or not with glass fibres. The rigid material 62 comprises a cylindrical axial external surface 62a of small axial dimension from the bottom end of which extends an annular radial surface 62b which is prolonged towards the inside and downwards by a rounded surface then by an axial surface 62c. The axial surface 62c makes it possible to centre the spring 18, whereas the radial surface 62b provides a bearing surface for said spring.

From the bottom end of the axial surface 62c, a radial annular surface 62d extends towards the inside, prolonged from an edge of small diameter axially upward by an axial surface 62e forming the bore of the bottom support cover 42.

From the top end of the axial external surface 62a, the rigid material 62 of the body 60 also comprises first and second axial annular ribs 62f, 62g extending axially towards the bearing cover 40. The top end of the first rib 62f of large diameter is axially retracted downwards relative to the top end of the second rib 62g. The rib 62g radially surrounds the toroidal portion 48b of the bottom ring 48. The top end of the rib 62g is prolonged towards the inside by a surface 62h in contact with the toroidal portion 48a of the bottom ring 48 and of a form complementing said portion 48a. The toroidal surface 62h is prolonged towards the inside by a truncated surface from which extends an axial surface 62i which is prolonged, at a radially bottom end towards the inside, by an annular radial surface 62j which is connected to the axial surface 62e by a rounded surface.

The stiffening insert 66, of generally annular form, has a straight section generally in the form of an L. It comprises an axial portion 66a which is prolonged, towards the outside from a top end, by a rounded portion 66b from which extends radially towards the outside a radial portion 66c. The stiffening insert 66 can, for example, be obtained by cutting and stamping from a relatively thick steel plate flank to ensure a sufficient rigidity.

The axial 66a and rounded 66b portions are entirely embedded inside the rigid material 62 of the body 60. The axial portion 66a extends axially between an area situated in the vicinity of the radial annular surface 62d and an area situated level with the radial surface 62b. The radial portion 66c extends radially between an area situated level with the toroidal portion 46b of the top ring 46 and an area situated level with the toroidal area 48b of the bottom ring 48. The stiffening insert 66 thus makes it possible for the bottom support cover 42 to transmit to the rolling bearing 44 the axial and radial forces exerted by the spring 18.

The stiffening insert 66 comprises a plurality of through-orifices 68 provided on the radial portion 66c in the immediate vicinity of the rounded portion 66b. The orifices 68, of which there are ten here, are distributed evenly in the circumferential direction. The stiffening insert 66 also comprises a plurality of notches 70 provided from the free edge of the radial portion 66c. The notches 70 have a generally concave form and are positioned so that each orifice 68 is radially aligned with a notch 70. Each notch 70 is therefore positioned in one and the same radial plane as one of the orifices 68.

In this embodiment, the rigid material 62 of the body 60 is overmoulded on the stiffening insert 66, these two elements thus being joined to each other. When overmoulding the rigid material 62, axial channels 72 and 74 (FIG. 3) are provided, the first series of channels 72 passing through the orifices 68 of the stiffening insert 66 and the second series of channels 74 through the notches 70 so that an internal axial channel 72 is situated in one and the same radial plane as an external channel 74. The axial channels 72 and 74 are provided in such a way that the rigid material 62 can cover the bore of each orifice 68 and the edge delimiting each notch 70. Each internal channel 72 is linked to the associated external channel 74 by a radial channel 76, opening out or open, provided under the radial portion 66c of the stiffening insert 66. As a variant, the rigid material 62 could be overmoulded over the insert so as not to cover the inside of the orifices 68.

The flexible material 64 of the body 60 is then overmoulded over the stiffening insert 66 and the rigid material 62 to form internal 78 and external 80 seals. The flexible material 64 can be made of elastomer, for example of synthetic rubber such as polyurethane.

Thanks to the existence of the channels 72 and 74 passing axially through the stiffening insert 66 and linked to each other by the radial channels 76, the flexible material 64 can be overmoulded with a smaller number of injection points, the molten flexible material then being distributed in the manufacturing mould to form the seals 78, 80. The structure of the manufacturing mould is thus simplified.

In other words, the orifices 68 and the notches 70 of the stiffening insert 66 form passages having a dual function, namely to allow the transfer and the circulation of the flexible material 64 between two opposite surfaces of the insert 66 when manufacturing the support cover 42, and also to provide an effective key for the flexible material 64 on said insert. The overmoulding of the two different materials of the body 60 is therefore performed in two successive steps which can be carried out by different techniques, for example by simple overmoulding or even by bi-injection.

By producing the body 60 from two different materials, it becomes possible to obtain a bottom support cover 42 that can effectively provide different mechanical functions. Obviously, it will be understood that it could also be possible to produce the body 60 with a greater number of materials.

The internal seal 78 comprises a plurality of axial internal posts 81, ten of them in this case, formed inside the channels 72 of the rigid material 62. Each internal post 81 extends axially from an area situated in the vicinity of the radial surface 62b to the level of the opposite radial surface 62j. Each post 81 therefore passes axially through the stiffening insert 66, being radially surrounded by rigid material 62. In other words, at the level of each orifice 68 of the stiffening insert 66, a part of the rigid material 62 is radially situated between a part of the flexible material 64 and the radial portion 66c of the stiffening insert 66.

The seal 78 is also provided with an annular lug 84a covering the radial surface 62j and linked to all the posts 81, and a relatively thin annular internal sealing lip 84b extending projecting towards the inside from the lug 84a. The sealing lip 84b comes into friction contact with the external surface of the internal axial skirt 40c of the top bearing cover 40. It is curved downwards.

The external seal 80 also comprises ten external axial posts 83 formed inside the channels 74 of the rigid material 62. Each external post 83 extends axially from an area situated in the vicinity of the radial surface 62b to the level of the top end of the rib 62f. Each post 83 passes axially through the stiffening insert 66, being radially surrounded by rigid material 62. Thus, at the level of the edge delimiting each notch 70 of the stiffening insert 66, a part of the rigid material 62 is radially situated between a part of the flexible material 64 and the radial portion 66c of the stiffening insert 66.

The seal 80 is also provided with an annular lug 86a covering the top end of the rib 62f and the external lateral surface of the rib 62g, and linked to all the posts 83. The seal 80 also comprises a relatively thin external annular sealing lip 86b projecting outwards from the lug 86a. The sealing lip 86b comes into friction contact against the bore of the external skirt 40d of the top bearing cover 40. It is curved downwards. The posts 81, 83 situated in one and the same radial plane are linked together by a radial link bead 82 formed by one of the radial channels 76. Each bead 82 comes into direct contact against the radial portion 66c of the stiffening insert 66 and opens out level with the radial surface 62b. The stiffening insert 66 is entirely covered by the rigid material 62 and the flexible material 64. In other words, the stiffening insert 66 is entirely embedded inside the body 60.

The internal 78 and external 80 seals fulfil a static sealing function with the bottom support cover 42 and a dynamic sealing function with the top bearing cover 40. In this embodiment, the internal sealing lip 84b cooperates with the skirt 40 of the bearing cover 40. As a variant, it could also be possible to consider providing a cooperation with the external ring of the rolling bearing 44, for example level with the toroidal portion 46b.

The downward curvature of the internal 84b and external 86b sealing lips is particularly advantageous in as much as it increases their ability to repel any splashes of water or other pollutants. The lips 84b, 86b therefore form particularly effective deflectors. Furthermore, with such splashes, the contact pressure between the lips and the top bearing cover 40 increases, which further increases the effectiveness of said lips.

Moreover, the sealing lip 86b has another function: to axially retain the top bearing cover 40 before the bearing is fitted. For this, the sealing lip 86b has an external diameter greater than the diameter on which the ends of the catches 40e are situated, and it is positioned above the latter so as to be able to interfere diametrically with said catches should the support cover 42 and the bearing cover 40 start to separate before the bearing is mounted in the assembly for which it is intended. The sealing lip 86b therefore also serves as an axial retaining means for the top bearing cover 40 relative to the bottom support cover 42.

Moreover, the downward orientation of the sealing lip 86b facilitates its distortion when the parts are assembled while providing a sufficient axial retention for the duly constructed assembly to be handled and transported without risk of accidental dismantling.

Figure 6:
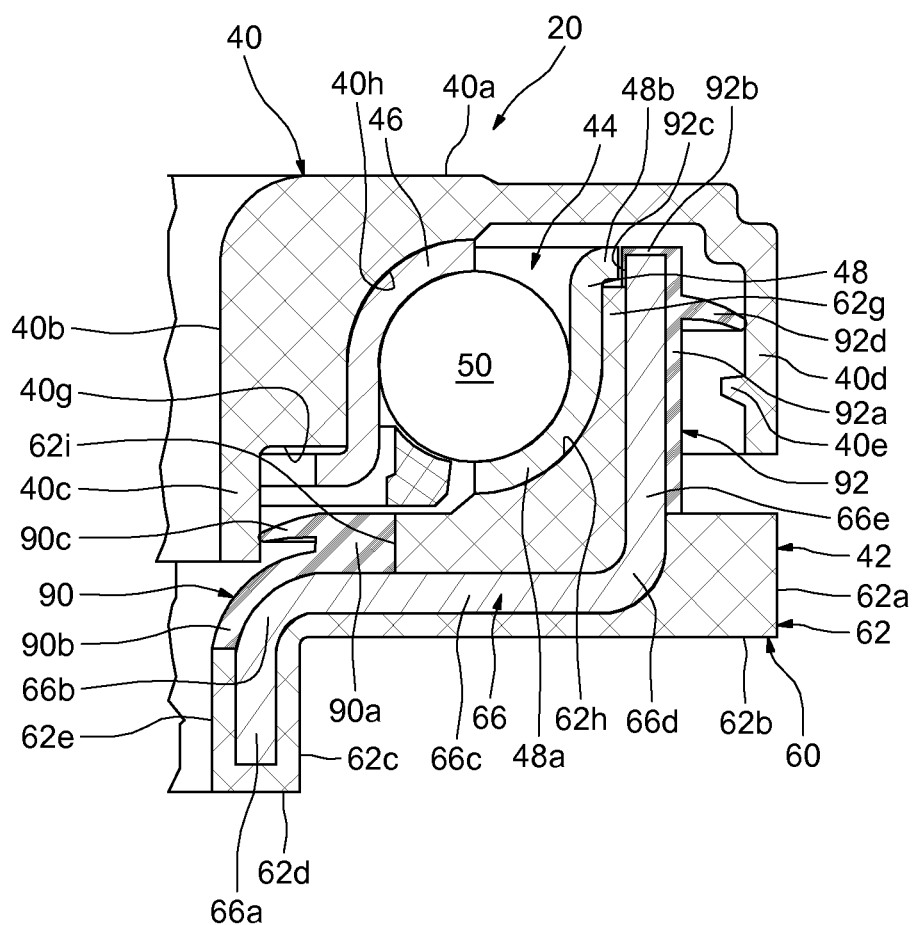
FIG. 6 is a partial axial cross-sectional view of a suspension thrust bearing device according to a second embodiment of the invention.

In the embodiment illustrated in FIG. 6, in which similar elements are given the same references, the stiffening insert 66 also comprises a rounded portion 66d upwardly prolonging the large diameter edge of the radial portion 66c, itself prolonged axially upward by an axial portion 66e extending axially to the vicinity of the toroidal portion 48b of the bottom ring 48. In this embodiment, the axial portion 66a has a smaller axial dimension.

The rigid material 62 is in this case overmoulded over the stiffening insert 66 so that the top surface of the rounded portion 66b and an adjacent portion of the top surface of the radial portion 66c are left free. Most of the axial external surface of the axial portion 66e is also uncovered. The rest of the stiffening insert 66 is embedded in the rigid material 62. In other words, the insert 66 is partially embedded inside the rigid material 62.

In this embodiment, the bottom support cover 42 comprises internal 90 and external 92 seals directly covering the portions of the stiffening insert 66 left free by the rigid material 62. Said seals can be made of elastomer, for example of synthetic rubber like polyurethane.

The annular internal seal 90 is overmoulded over the rounded portion 66b and over a part of the radial portion 66c, as well as over the parts of adjacent rigid material 62. The internal seal 90 comprises an annular axial portion 90a in contact against the radial portion 66c of the insert and the axial surface 62i of the rigid material 62. A part of the rigid material 62 is therefore situated radially between the axial portion 90a and the axial part 66e of the stiffening insert 66.

From the axial portion 90a there are derived a dynamic sealing lip 90c and a static sealing lip 90b. The annular sealing lip 90c extends radially to project towards the inside and is in friction contact against the outer surface of the internal axial skirt 40c of the top bearing cover 40 by being oriented slightly downward. The sealing lip 90b entirely covers the rounded portion 66b of the stiffening insert 66 so as to prolong upward the axial surface 62e of the rigid material 62.

The annular external seal 92 comprises an annular axial portion 92a covering the axial external surface of the axial portion 66e of the stiffening insert 66 that is left free, the internal axial surface being mostly covered by the rigid material 62. The axial portion 92a is prolonged at its top end by a radial portion 92b covering the free end of the axial portion 66e, which is itself prolonged by a short axial flange 92c extending downward and coming into contact against the top end of the internal axial surface of the axial portion 66e and the top end of the rib 62g. The flange 92c is situated radially between the toroidal portion 48b of the bottom ring 48 and the axial portion 66e of the stiffening insert 66. The stiffening insert 66 is therefore entirely embedded in the rigid material 62 and the seals 90, 92.

The external seal 92 also comprises a relatively thin annular lip 92d projecting radially outward and inclined downward. The lip 92d comes into friction contact against the bore of the external axial skirt 40d, by being situated above the catches 40e. The internal 90 and external 92 seals fulfil a static sealing function with the bottom support cover 42 and a dynamic sealing function with the top bearing cover 40.

In this embodiment, the areas of the stiffening insert 66 that are not covered by the rigid material 62 are used for directly overmoulding the flexible seals 90, 92 over said insert, forming, with said rigid material, the body 60. The result is that these seals are fixed while at the same time the areas of the stiffening insert likely to be in contact with splashes of water or other pollutants are entirely covered, which limits the risks of corrosion of the insert that can be made from an untreated steel plate flank. The need to have relatively costly anti-corrosion surface treatments, which are polluting factors in themselves, is thus avoided.

Thanks to the invention, it is possible to produce, in a particularly economical way, a bottom support cover that is capable of effectively transmitting the forces exerted by the suspension spring, that is insensitive to corrosion, and that provides a good seal for the bearing. The life of the suspension thrust bearing is thus extended and the risk of noisy operation that could be due to internal corrosion of the rolling bearing is reduced.

The invention claimed is:

1. A thrust bearing device for a strut, the strut including a spring, the device comprising:
    an axial thrust rolling bearing including a bottom ring, a top ring, and a plurality of rolling elements positioned between the bottom and top rings; and
    a support element for the rolling bearing and providing bearing means for the spring, the rolling bearing bottom ring being in contact with the support element, the support element including a body and a stiffening insert at least partly covered by the body, the body being formed of a rigid material configured to transmit axial forces between the spring and the rolling bearing and a flexible material configured to provide at least one dynamic seal inside the device, at least a part of the rigid material being disposed radially between the flexible material and the stiffening insert.

2. The device according to claim 1, further comprising a top bearing cover in direct contact with the top ring of the rolling bearing, the dynamic seal including at least one external lip in frictional contact with the top bearing cover.

3. The device according to claim 2, in which the dynamic seal includes at least one internal lip in frictional contact with one of the top bearing cover and the top ring.

4. The device according to claim 1, in which the rigid material is in direct contact with the stiffening insert.

5. The device according to claim 1, in which the flexible material is in direct contact with the stiffening insert.

6. The device according to claim 1, in which the stiffening insert is at least partly embedded inside the body.

7. The device according to claim 1, in which the flexible material is at least partly overmoulded over the rigid material.

8. The device according to claim 1, in which the flexible material is at least partly overmoulded over the stiffening insert.

9. The device according to claim 8, in which the stiffening insert includes means for allowing the passage of the overmoulded flexible material through the insert.

10. The device according to claim 1, in which the stiffening insert includes a radial portion and at least one axial portion.

11. A strut comprising:
   a damper;
   a spring; and
   a suspension thrust bearing device including:
   an axial thrust rolling bearing having a bottom ring, a top ring and a plurality of rolling elements positioned between the bottom and top rings; and
   a support element for the rolling bearing and providing bearing means for the spring, the rolling bearing bottom ring being in contact with the support element, the support element including a body and a stiffening insert at least partly covered by the body, the body being formed of a rigid material configured to transmit axial forces between the spring and the rolling bearing and a flexible material configured to provide at least one dynamic seal inside the device, at least a part of the rigid material being disposed radially between the flexible material and the stiffening insert.

* * * * *